(No Model.) 7 Sheets—Sheet 1.

C. WACHTEL.
DYNAMO ELECTRIC MACHINE.

No. 490,460. Patented Jan. 24, 1893.

Fig. 1

WITNESSES:

INVENTOR:
Charles Wachtel,
BY Fred C. Fraentzel, ATT'Y.

(No Model.) 7 Sheets—Sheet 2.

C. WACHTEL.
DYNAMO ELECTRIC MACHINE.

No. 490,460. Patented Jan. 24, 1893.

Fig. 2

WITNESSES: INVENTOR:
Wm H Canfield Jr. Charles Wachtel,
B. Mortimer Truesdell. BY Fred. C. Fraentzel. ATT'Y.

(No Model.) 7 Sheets—Sheet 3.

C. WACHTEL.
DYNAMO ELECTRIC MACHINE.

No. 490,460. Patented Jan. 24, 1893.

Fig. 3

WITNESSES:
Wm H Canfield Jr.
B. Mortimer Trusdell.

INVENTOR:
Charles Wachtel,
BY Fred K. Fraentzel, ATT'Y.

(No Model.) 7 Sheets—Sheet 4.

C. WACHTEL.
DYNAMO ELECTRIC MACHINE.

No. 490,460. Patented Jan. 24, 1893.

Fig. 4

WITNESSES:
Wm H Stanfield Jr
B. Mortimer Trusdell

INVENTOR:
Charles Wachtel,
BY Fred C. Fraentzel, ATT'Y.

(No Model.)  7 Sheets—Sheet 5.

C. WACHTEL.
DYNAMO ELECTRIC MACHINE.

No. 490,460. Patented Jan. 24, 1893.

Fig. 5

WITNESSES:

INVENTOR:
Charles Wachtel,
BY Fred'k C. Fraentzel, ATT'Y.

(No Model.) 7 Sheets—Sheet 6.

C. WACHTEL.
DYNAMO ELECTRIC MACHINE.

No. 490,460. Patented Jan. 24, 1893.

WITNESSES:
Wm H Blaufield Jr.
B. Mortimer Trusdell.

INVENTOR:
Charles Wachtel,
BY Fred C. Fraentzel, ATT'Y.

(No Model.) 7 Sheets—Sheet 7.

C. WACHTEL.
DYNAMO ELECTRIC MACHINE.

No. 490,460. Patented Jan. 24, 1893.

WITNESSES:

INVENTOR:
Charles Wachtel,
BY Fred C. Fraentzel, ATT'Y.

UNITED STATES PATENT OFFICE.

CHARLES WACHTEL, OF NEWARK, NEW JERSEY.

DYNAMO-ELECTRIC MACHINE.

SPECIFICATION forming part of Letters Patent No. 490,460, dated January 24, 1893.

Application filed June 13, 1892. Serial No. 436,470. (No model.)

*To all whom it may concern:*

Be it known that I, CHARLES WACHTEL, a citizen of the United States, residing at Newark, in the county of Essex and State of New Jersey, have invented certain new and useful Improvements in Electro-Dynamo Machines; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The present invention relates to improvements in dynamo-electric machines, and the main features of this invention relate especially to improvements in the organization and construction of the dynamo-electric machine herein shown and described. These features consist in the construction and arrangement of the wide foot-pieces or standards of the iron frame to which the outer ends of a stationary electro-magnet are secured; in the arrangement of the electro-magnet between said foot-pieces which enables the use of an armature of greatly increased diameter, and hence a lesser number of revolutions of the machine, resulting in a uniformly running, noiseless and firm machine; in forming the armature core of thin wrought iron semi-circular rings or disks; in arranging such semicircular ring, in the form of half cylinders, insulating said rings one from the other; in the manner of securing two such half cylinders together by means of dove-tail portions to form the armature; and finally, securing said armature by means of insulated bolts to spider arms on bearing plates upon the shaft.

The invention consists, further, in the novel construction and arrangement of the commutator, in substituting sectional sleeves, made from porcelain or other like material, in place of the usual metal sleeves, and the means for securing said sectional sleeves upon the shaft, and also the commutator sections upon the porcelain sectional sleeves; and finally, in securing the fiber disks to the core of the electro-magnet.

In the accompanying drawings, is illustrated a dynamo-electric machine embodying my invention.

In said drawings.

Figure 10:
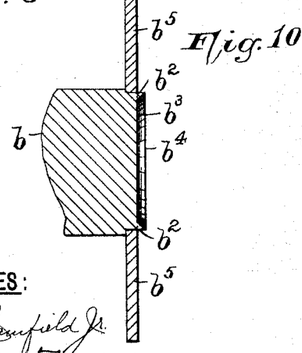
Figs. 10 and 11 are detail views, to illustrate the manner of securing a fiber disk to the end of the core of the electro magnet.
Figure 11:
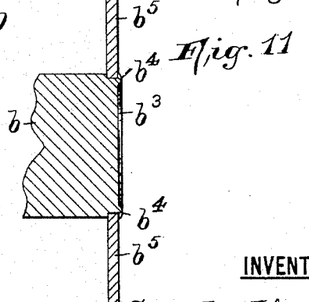

As will be seen from said drawings, the stationary magnet $b$ is arranged in a horizontal position between the iron frame-pieces or supports $a$, $a$ respectively connecting the outer ends of the magnet. As will be seen from Figs. 10 and 11, the core $b'$ of the magnet is turned down at each end with a shoulder $b^2$, and its ends are turned out, as at $b^3$, forming a thin annular ring $b^4$. The fiber disks $b^5$ are arranged against the shoulders $b^2$ and by means of a suitable tool the marginal rim $b^4$ is bent over and down upon the fiber disk and thereby insuring a very close contact surface on each end of the magnet with the contact surfaces $a'$ of each frame-piece $a$. The magnet is secured between said surfaces by means of suitable screw-bolts $a^2$. The frame-pieces or supports $a$ extend downward to form the legs or standards $a^3$ having at their lower ends laterally projecting flanges $a^4$, provided with holes for the reception of bolts $a^5$, by means of which the machine is secured to the surface of a table $a^6$ or other suitable support. The frame pieces or supports are also provided with suitable strengthening ribs $a^7$ and are cast with the large semi-circular edges $a^8$ between which the armature may rotate and also to provide for a free circulation of air between the frame pieces or supports into and from the spaces surrounding the armature and also beneath the stationary electro-magnet. By this arrangement and form of the frame, and one stationary electro-magnet at the top, I derive increased space for an armature of greatly increased diameter and hence the machine can be run slower for maintaining a current of great strength, and a machine has been constructed in which the noise and shake has been reduced to a minimum.

Figure 1:
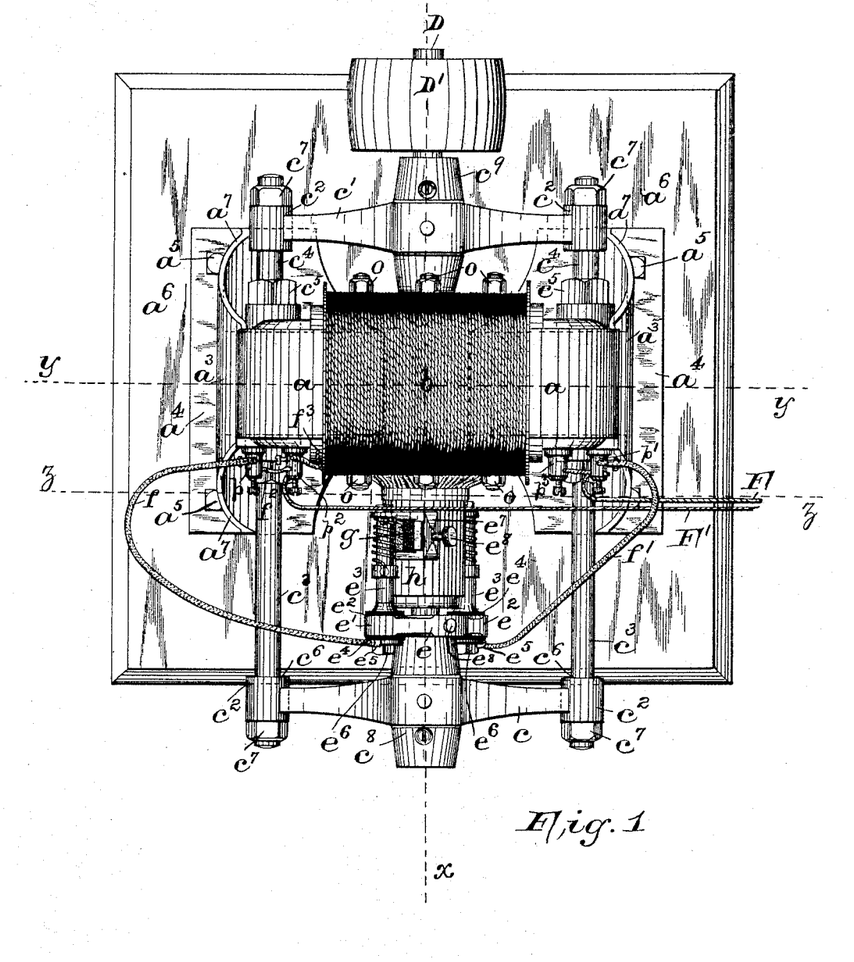
Figure 1 is a plan or top view of the machine.
Figure 2:
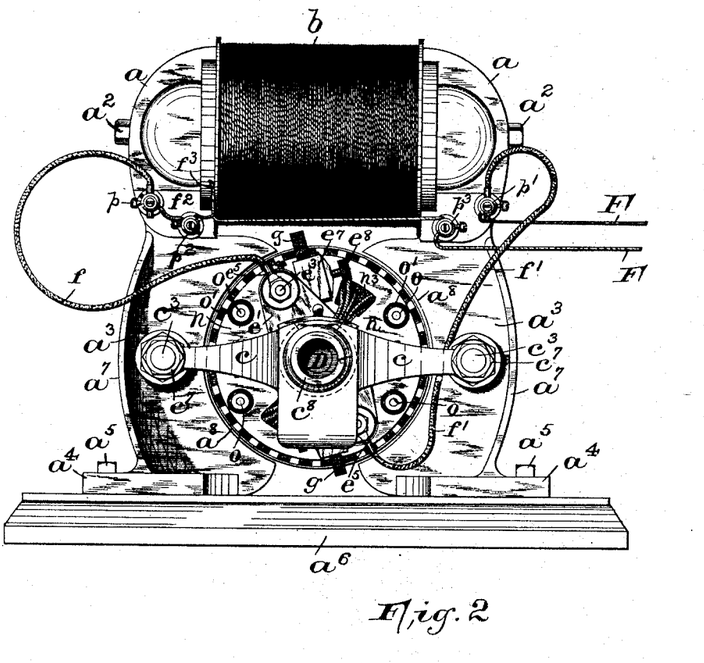
Fig. 2 is a front elevation of the same.
Figure 3:
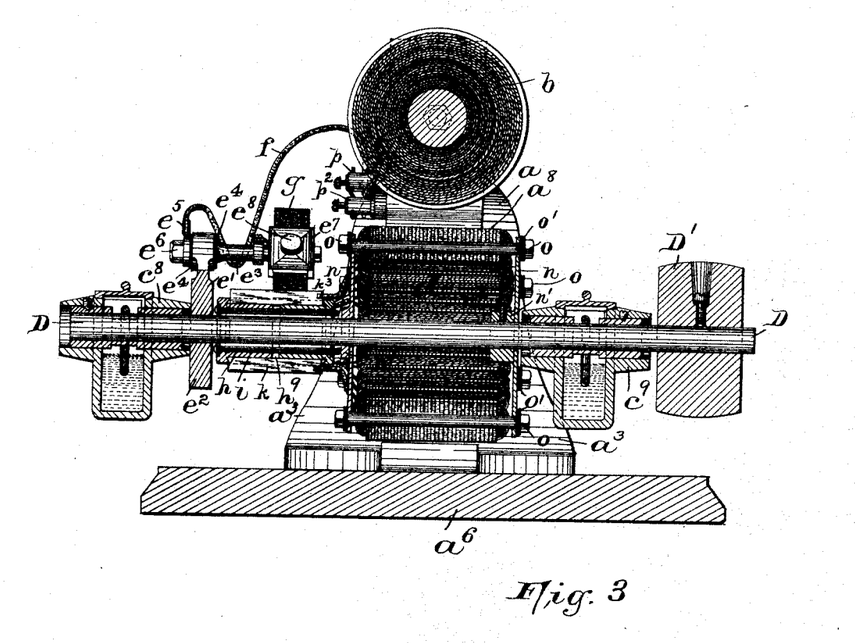
Fig. 3 is a longitudinal vertical section taken on line $x$ in Fig. 1.
Figure 4:
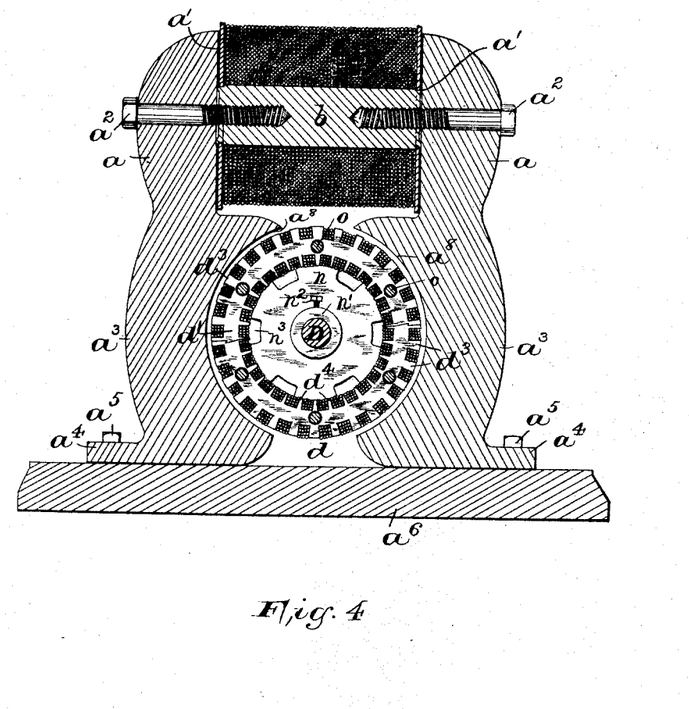
Fig. 4 is a vertical cross-section through line $y$ in said Fig. 1.

As will be seen more especially from Figs. 1 and 2, the supporting frame for the shaft D of the machine consists of suitable yokes $c$ and $c'$ provided with the supporting sleeves $c^2$ arranged on suitable screw-threaded rods extending from the sides of the standards or legs $a^3$ being firmly locked by means of nuts $c^5$ on said rods, and said sleeve-portions $c^2$ on the yokes being secured down against shoulders $c^6$ on said rods $c^3$ and $c^4$ and held in position by means of nuts $c^7$. Said yokes $c$ and $c'$ are each provided with suitable bearings $c^8$ and $c^9$ respectively, in which said shaft D revolves. These bearings, which do not form any material part of my present invention, are preferably of the construction illustrated in Fig. 3, being provided with a deep oil-well and means for keeping up a constant supply of the lubricating material upon the shaft and its bearings.

Secured to the inner portion of the hub of the bearing $c^8$, and loosely arranged on the shaft D, is a frame $e$ consisting of two oppositely extending arms $e'$ provided at their extreme ends with eyes $e^2$ for the reception of the brush-holding arms $e^3$. Said arms $e^3$ secured in said eyes $e^2$ are insulated therefrom by means of the disks $e^4$, and upon the outer ends of the arms $e^3$ I arrange sockets $e^5$ or other suitable devices for securing the ends of the wires $f$ and $f'$ thereto, the whole being firmly secured in position by the nuts $e^6$. Upon the other and free ends of said holding arms I arrange suitable spring-actuated clamping devices $e^7$ in which are adjustably secured by means of thumb-screws $e^8$, carbon pencils or other suitable brushes $g$, as will be clearly seen from Figs. 2 and 3. Directly beneath said pencils or brushes and upon the shaft D is placed the commutator $h$, which is preferably of the improved construction to be now more fully described in detail.

As will be seen more especially from Figs. 3, 6, 7, 8 and 9, I prefer to use in combination with the commutator sections $k$, of copper, a sectional core upon which said sections or bars $k$ are arranged, said sectional core being made of porcelain or other like non-conducting material. As will be seen from said Figs. 8 and 9, said core is preferably made from two sleeve-like sections $h^2$ and $h^3$, each provided with a main central opening $h^4$ for arranging them on the shaft D and each provided with correspondingly placed openings $h'$, in the form of slots, for the reception of tie-bolts $i$.

Figure 8:
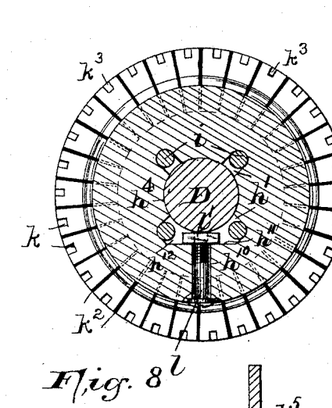
Fig. 8 is a vertical section taken on line $u$ in Fig. 7.
Figure 9:
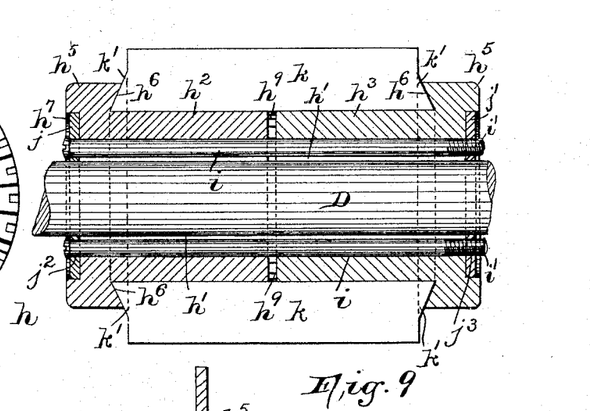
Fig. 9 is a longitudinal vertical section of the commutator, to clearly illustrate the manner of securing the several parts together.

Each section $h^2$ and $h^3$ is provided with an enlarged annular portion $h^5$ being provided on its inner surface with an annular under cut recess $h^6$ and on their outer surfaces they are preferably provided with recesses $h^7$. Into said recesses are fitted brass or other suitable rings $j$ and $j'$, the ring $j$ being provided with holes $j^2$ and the ring $j'$ with screw-threaded holes $j^3$.

In order to arrange the copper commutator sections $k$ in their proper positions, each section is provided with an angularly projecting portion $k'$ which portions are fitted into said under-cut recesses $h^6$, as clearly shown in Fig. 9. This leaves a clear space $h^9$ between the inner ends of the two sections $h^2$ and $h^3$, and in order to firmly secure the several parts together, the bolts $i$ are inserted through the holes $j^2$ in the ring $j$, through the slotted openings $h'$ in the two sections and their screw-threaded ends $i'$ are screwed into the threaded holes $j^3$ in the ring $j'$. In this manner the several parts can be firmly drawn together and the under-cut recesses $h^6$ will grip the angular projections $k'$, which prevents the displacement of any of the commutator sections during the revolutions of the machine. Each commutator section $k$ is insulated from its adjacent section by means of a thin sheet of suitable non-conducting material $k^2$, as will be evident from the drawings.

In order to firmly secure the commutator on the shaft D and to prevent its slipping thereon; I provide one of the sections as $h^2$, with a hole $h^{10}$ into which I insert a screw $l$. Below said hole $h^{10}$ said section is provided with an enlarged chambered portion $h^{11}$ having a side wall $h^{12}$. Into this chamber I place an ordinary brass nut $l'$ into which said screw $l$ is secured. Said wall $h^{12}$ prevents the turning of said nut and when the screw $l$ is screwed up said nut comes in contact with said wall $h^{12}$ and is thus firmly drawn up against the section $h^2$, while the screw moves through the nut and firmly embeds itself in the peripheral surface of the shaft D, as will be clearly understood.

Each commutator section $k$ is provided with a recess or suitable opening $k^3$ in which the ends of the wire coils of the armature are secured in any well known manner.

Figures 12, 13, 14:
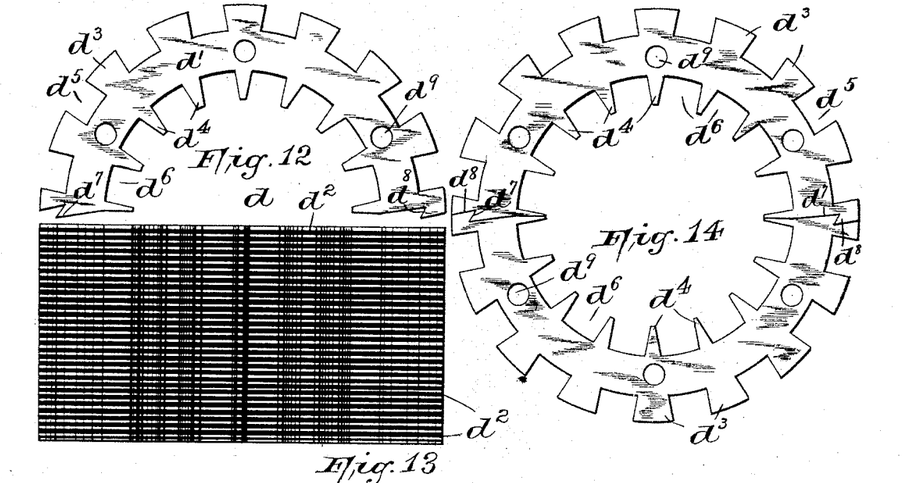
Fig. 12 is an end view of one half of the armature frame.
Fig. 13 is a bottom view of the same, clearly illustrating the arrangement of the semi-circular rings used, and having non-conducting material between them.
Fig. 14 is a view of an armature ring of the half cylindrical armature section held together by means of dove-tail portions.

My improved form of armature $d$ consists substantially of a series of semi-circular rings $d'$ which are arranged upon each other with thin sheets of insulating material $d^2$ between them, to form, what may be termed semi-cylindrical sections, and which are clearly illustrated in Fig. 13. Said semi-circular rings are each provided with outwardly projecting portions $d^3$ and inwardly projecting portions $d^4$ and with the dove-tailed portions $d^7$ and $d^8$.

Figure 5:
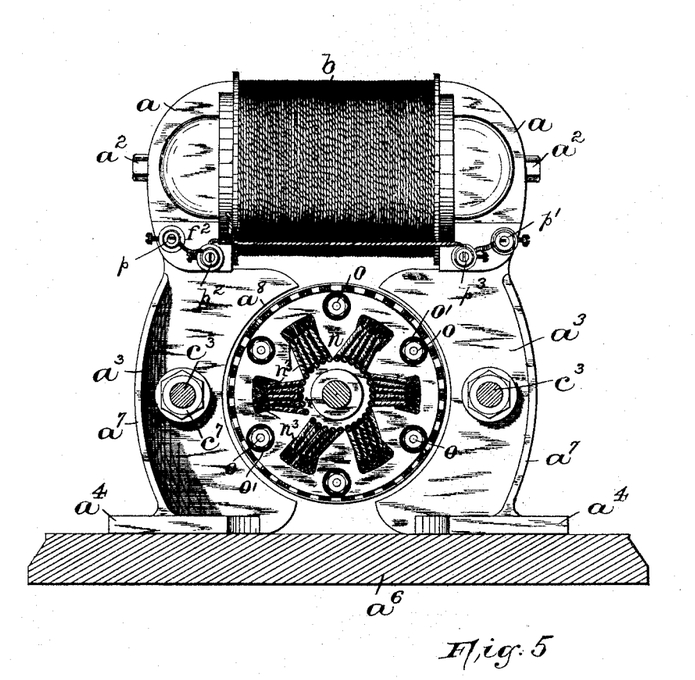
Fig. 5 is a like section taken on line $z$ in said Fig. 1.
Figure 6:
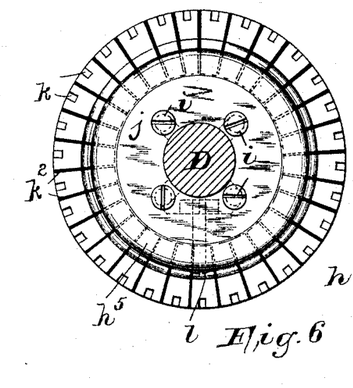
Fig. 6 is an end view of the commutator.
Figure 7:
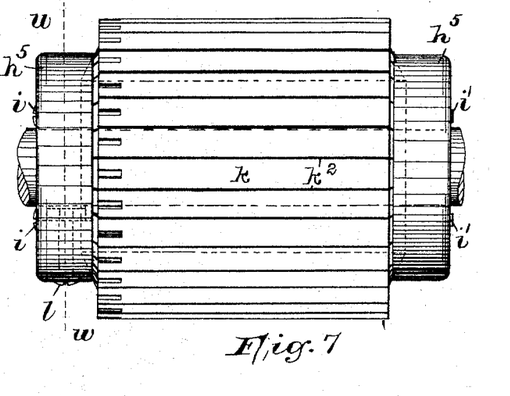
Fig. 7 is a side view of the same.
Figure 16:
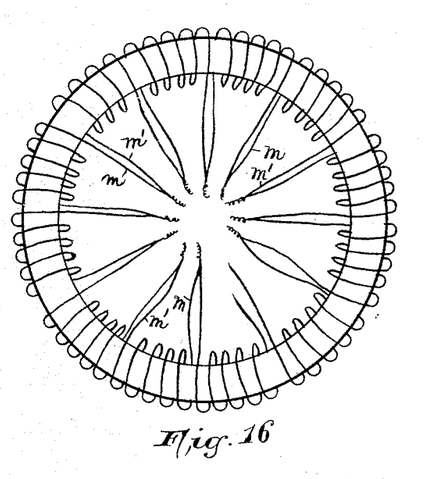
Fig. 16 is a diagrammatic view of the armature, illustrating the manner of winding.

In order to wind the armature sections, I take a spool of wire of the required size and length and wire the same around the adjacent rings lengthwise, until the recesses or cut-away portions $d^5$ and $d^6$ are entirely filled, thus leaving two projecting ends $m$ and $m'$ of the wire, as indicated in Fig. 16. The end $m'$ of the coil just wound is now connected with the free end of another spool of wire of the same size and length, and wound in a like manner, to fill the next cut-away portions $d^5$ and $d^6$, and so on, until all of said cut-away portions on the one semi-cylindrical section of the armature has been wound, thus leaving two free ends of the wire coils, at the beginning of the winding and at the completion thereof, dangling from the semi-cylindrical section. I next take the same number of semi-circular rings and form a second semi-cylindrical armature section, winding the same in a like manner. The two completed armature sections are then placed upon one another and locked together by means of the dove-tailed portions of the several semi-circular rings, as clearly shown in Fig. 14, and the four dangling ends of the several wire coils are connected together in the proper manner, so as to form a complete circuit through the several coils of wire. The hollow armature thus formed is placed between the spider plates or bearings $n$ provided with hubs $n'$ secured to the shaft D by means of set-screws $n^2$, as will be seen from Fig. 3. The armature is arranged in position between said plates $n$ provided with arms forming openings $n^3$, by means of insulated bolts $o$ secured by means of nuts, and are further insulated from said plate $n$ by washers $o'$ of non-conducting material, said bolts passing through holes $d^9$ in the armature sections. The connected ends of the wire coils are then passed through the openings $n^3$, as shown in Fig. 5, and secured in the recesses or openings $k^3$ of the commutator sections, as clearly illustrated in Fig. 3.

Upon the free end of the shaft D is arranged any suitable pulley D', as shown.

The wire connections are made as follows:—In the sockets $e^5$ are arranged, as has been stated, the ends of the wires $f$ and $f'$, and which communicate with binding posts $p$ and $p'$ arranged on plates of non-conducting material on the side of each frame-piece or support $a$. A wire $f^2$ connects the post $p$ with a post $p^2$, and with the coil of wire $f^3$ on the stationary magnet, or it may be connected directly therewith. The opposite end $f^4$ of the wire coil connects with a binding post $p^3$, and with the posts $p'$ and $p^3$ are connected the main wires F and F'. This arrangement is clearly shown in Fig. 2, and when thus arranged the entire electrical current passes through the magnet. But in order to prevent any accidental burning out of the wire encircling the electro-magnet, the current generated by the machine may be divided by connecting the wire F' with the binding post $p^2$, thereby causing only part of the current to pass through the magnetic coil, as will be evident from Fig. 1, in which view the wires have been arranged in this manner.

By my improved form of dynamo electric machine, and the arrangement and construction of parts, I have devised a very economic machine, and one, in which the loss of electric current has been reduced to a minimum. There is less magnetic resistance, owing to the fact that the lines of magnetic distribution describe a very short path in passing from one pole of the magnet through the iron frame-pieces or supports and through the armature to the opposite pole of the magnet, and magnetic polarization is almost, if not entirely, impossible.

In my present construction, I can employ but one electro-magnet, and hence obtain increased space from the base of the machine to the bottom surface of the stationary magnet. This enables the use of an armature of greatly increased diameter, and for the same amount of power desired the machine can be run with less speed than the machines of this class now in use. Furthermore, by the use of the hollow armature, I provide for a free circulation of air around the shaft and the machine is kept perfectly cool while running.

The construction of the semi-circular armature sections is a very cheap construction, as these parts can be struck up by means of suitable dies, the rings being made from thin wrought iron plates.

Figure 15:
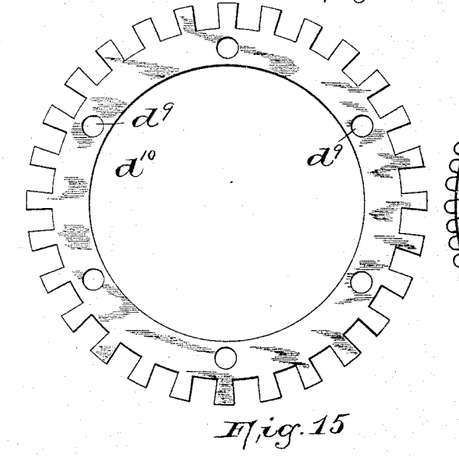
Fig. 15 is a view of an armature ring of a modified form of construction.

In lieu of the construction of armature illustrated in Figs. 12, 13 and 14, said armature may be made up of rings $d^{10}$, as illustrated in Fig. 15, but the other form of armature is the preferred.

Having thus described my invention, what I claim is:—

1. The herein described dynamic electric machine, comprising therein, the iron frame-pieces or supports $a$, connected with the outer ends of a stationary magnet, provided with supports having foot-pieces and laterally projecting flanges, and provided with semi-circular edges $a^8$, an armature shaft and an armature thereon, rotating between said semi-circular edges, and a commutator on said shaft, consisting of two sections $h^2$ and $h^3$, having longitudinal slots or openings, each section having an annular portion $h^5$ and an undercut portion $h^6$, insulated commutator sections between said annular portions, suitable brass rings $j$ and $j'$ and screws or bolts for securing all of said parts together, substantially as and for the purposes set forth.

2. The herein described electro-magnet, for a dynamo electric machine, comprising therein a solid core $b$ having its ends turned out, as at $b^3$, forming annular rings $b^4$, and provided with shoulders $b^2$, and fiber disks arranged on said shoulders, said rings $b^4$ extending through central openings in said disks and being adapted to be turned over and against said disks, substantially as and for the purposes set forth.

3. In a dynamo electric machine, the herein described commutator consisting essentially of porcelain sections, having longitudinal slots or openings, each section having an annular portion $h^5$ and an undercut portion $h^6$, insulated commutator sections between said annular portions, suitable brass rings $j$ and $j'$ and screws or bolts for securing all of said parts together in the manner, substantially as and for the purposes herein set forth.

4. In a dynamo electric machine, the herein described commutator consisting essentially of porcelain sections, having longitudinal slots or openings, each section having an annular portion $h^5$ and an undercut portion $h^6$, insulated commutator sections between said annular portions, suitable brass rings $j$ and $j'$ and screws or bolts for securing all of said parts together in the manner, substantially as herein set forth, in combination, with the shaft of the machine, a screw $l$ and a nut $l'$, arranged in one of said sleeve-like sections, substantially as and for the purposes set forth.

5. In a dynamo electric machine, in combination, a stationary electro magnet, iron frame-pieces $a$ connecting the outer edges of said magnet, provided with supports having foot pieces and laterally projecting flanges, and provided with semi-circular edges $a^8$, and an armature rotating between said edges, said armature consisting essentially of insulated semi-circular plates or rings provided with dove-tail portions, and wound with wire coils to form semi-cylindrical armature sections, two of said sections being dove-tailed together, plates $n$ provided with spider arms, insulated bolts for securing said armature sections between said plates, and a commutator consisting essentially, of porcelain sections, having longitudinal slots or openings, annular portions or rings $h^5$ on said sections provided with undercut portions $h^6$, insulated commutator sections between said annular portions, suitable brass rings $j$ and $j'$, and screws or bolts for securing all of said parts together, and means for securing said commutator on the shaft, all arranged substantially as and for the purposes set forth.

In testimony that I claim the invention set forth above I have hereunto set my hand this 12th day of April, 1892.

CHARLES WACHTEL.

Witnesses:
FREDK. C. FRAENTZEL,
WM. H. CAMFIELD, Jr.